United States Patent [19]
Minnite

[11] 3,844,373
[45] Oct. 29, 1974

[54] STEERABLE VEHICLE
[76] Inventor: Ralph Minnite, P.O. Box 198, Cantua Creek, Calif.
[22] Filed: Jan. 26, 1973
[21] Appl. No.: 327,225

[52] U.S. Cl. ............................. 180/79.2 R, 280/97
[51] Int. Cl. ......................... B62d 3/14, B62d 5/10
[58] Field of Search ............... 180/79.2 R, 79.4, 79; 280/97, 267, 87.01

[56] References Cited
UNITED STATES PATENTS
| 941,309 | 11/1909 | Colt | 180/79.4 |
| 1,151,822 | 8/1915 | Reese | 280/97 X |
| 3,153,462 | 10/1964 | Peller | 180/79.2 R |
| 3,618,970 | 11/1971 | Frigaard | 280/87.01 |

Primary Examiner—David Schonberg
Attorney, Agent, or Firm—Huebner & Worrel

[57] ABSTRACT

A steerable vehicle characterized by a symmetrical frame of a substantially rectangular configuration, a plurality of longitudinally spaced wheel-supporting axles extending between the opposite sides of the frame, means for joining the opposite end portions of at least one of the axles to the frame including a pair of cam blocks rigidly affixed to each of the opposite sides of the frame. Each of the cam blocks is provided with a bifurcated slot forming a pair of downwardly diverging cam surfaces adapted to be supported by the frame for engagement with an end portion of said one axle and a pair of hydraulic actuators for imparting pivotal motion to said one axle, whereby oscillatory motion is imparted to the opposite end portions thereof for imposing steerage on the vehicle.

7 Claims, 3 Drawing Figures

PATENTED OCT 29 1974    3,844,373

3,844,373

STEERABLE VEHICLE

BACKGROUND OF THE INVENTION

The invention relates to steerable vehicles and more particularly to a wheeled vehicle including a substantially symmetrical frame supported for rolling motion by a plurality of wheels, at least one of the axles being coupled with the frame through a pair of cam blocks configured to receive the opposite ends of the axle and accommodate oscillatory motion imparted thereto for controlling direction of the motion imparted to the vehicle.

The prior art is, of course, replete with steerable vehicles including frames mounted on wheel-supported axles. Frequently, the wheels employed in supporting such vehicles are mounted at the distal end of supporting axles, externally of the frame. In such positions, the wheels are substantially unshielded from impact so that the vehicles are particularly vulnerable to damage incurred through collision.

Of course, attempts have been made to provide protective shields about wheels employed in supporting vehicles, particularly those operated in an environment wherein collision frequently occurs. In most instances, such shields have not met with total acceptance in view of the inherent added factors of cost, weight and complexity. Accordingly, it can readily be appreciated that there currently exists a need for a practical, steerable vehicle having wheels mounted in a protected condition for reducing damage incurred through collision.

Accordingly, it is the general purpose of the instant invention to provide a steerable vehical having frame-supporting wheels arranged in a protected condition, whereby damage to the vehicle is minimized in the event that a substantial collision between the vehicle and a foreign object is experienced.

OBJECTS AND SUMMARY OF THE INVENTION

It is therefore an object of the instant invention to provide an improved steerable vehicle with a tri-stable steering assembly.

It is another object to provide an improved steerable vehicle having supporting wheels disposed in a shielded relationship with the frame of the vehicle.

It is another object to provide an improved vehicle having steerable wheels disposed inwardly of the frame of the vehicle.

It is another object to provide a vehicle having a steerable wheel assembly including an elongated, wheel-supporting axle having its opposite ends extended into and supported by a pair of laterally spaced cam blocks, each having a bifurcated surface and an intermediate recess adapted to receive therein an end portion of the axle.

It is another object to provide an improved vehicle including an endless beam defining a closed frame, a plurality of laterally spaced axles traversing the frame and supporting thereon a plurality of frame-supporting wheels, and a pair of cam blocks coupling the opposite end portions of an axle with the beam, including a bifurcated slot for accommodating oscillatory motion simultaneously imparted to the opposite end portions of at least one of said axles for imposing steerage on the vehicle.

It is another object to provide an improved steerable vehicle including a frame, a plurality of elongated axles extended between the opposite sides of the frame, at least one of said axles being formed of a plurality of telescoping segments.

Another object is to provide an improved steerable vehicle including a closed frame and a plurality of wheel-supporting axles affixed to the frame, said wheels being disposed within a zone circumscribed by the frame.

These and other objects and advantages are achieved through the provision of an endless beam configured to define a symmetrical frame of a substantially rectangular configuration. The frame is supported by at least a pair of longitudinally spaced, wheel-supporting axles extended between the opposite sides of the frame and coupled thereto by means including a pair of cam blocks rigidly affixed to the frame, each of the cam blocks is provided with a bifurcated slot forming a pair of cam surfaces extended downwardly from a recess provided for receiving an end portion of an axle, and a pair of hydraulic rams affixed to the frame, each including a reciprocable output shaft pivotally coupled with an end portion of said axle, and an hydraulic circuit including a selector valve coupled with the rams for imparting simultaneous, relatively reversed linear motion to the output shafts, for thereby imparting angular displacement of the axle about midpoint thereof for thereby imparting steerage to the vehicle, as will become more readily apparent by reference to the following description and claims in the light of the accompanying drawings.

DESCRIPTION OF THE PREFERRED EMBODIMENT

Figure 1:
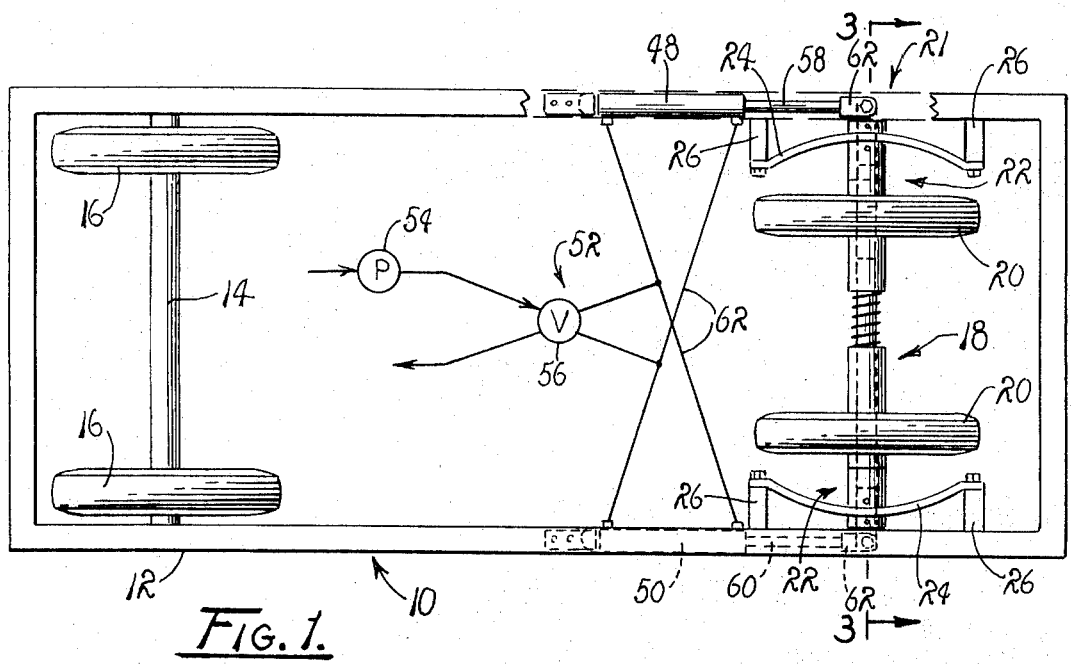
FIG. 1 is a top plan view of a vehicle which embodies the principles of the instant invention, including a frame mounted on wheel-supporting axles.
Figure 2:
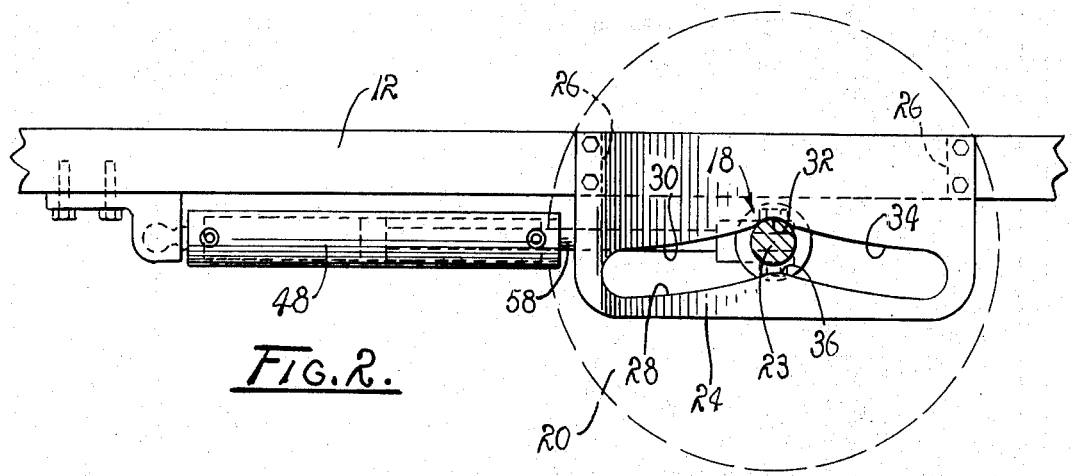
FIG. 2 is a fragmented, elevational view of a cam block and hydraulic actuator employed in pivotally displacing one of the axles shown in FIG. 1 for imparting steerage to the vehicle.

Referring now to the drawings wherein like reference numerals designate like or corresponding parts throughout the several views, there is illustrated in FIG. 1 a vehicle 10 which embodies the principles of the instant invention.

The vehicle 10 is provided with a load-bearing frame 12 of a substantially symmetrical, rectangular configuration. As a practical matter, the frame 12 is fabricated from a suitable structural member selected from a class including extruded shapes, such as box beams, I-beams and the like. The selected member is welded, or otherwise united, into a continuous beam. Of course, as can be appreciated, the particular material, from which the frame 12 is fabricated, as well as the specific shape of the member employed, is dictated by matters such as the desired weight-strength ratio and the particular environment in which the vehicle is to be employed.

As illustrated in FIG. 1, the vehicle 10 is provided with a first transverse axle 14 rigidly affixed to the frame 12 by suitable means, not designated. The axle 14 serves to mount a pair of laterally spaced wheels 16 which impart vertical support to the frame 12. Since the axle 14, as shown, is rigidly affixed to the frame 12, a detailed description of the bearing structure employed in mounting the axle 14 on the frame 12 and the wheels 16 on the axle 14 is omitted in the interest of brevity. However, it is to be understood that the wheels 16 are mounted on the axle through a use of suitable bearings and are disposed inwardly with respect to the frame 12 so that these wheels are adequately shielded against effects of collision.

The vehicle 10 further includes a segmented axle, generally designated 18, upon which is also mounted a pair of wheels 20 employed in supporting the frame 12 of the vehicle 10. As a practical matter, the axle 18 and wheels 20 form a portion of a steering assembly, designated 21, employed in imposing steerage on the vehicle 10 as the vehicle is advanced with rolling motion.

In order to achieve steerage, the opposite end portions of the axle 18, generally designated 22, include stub shafts 23 which are received in a metal-to-metal engagement with a pair of cam blocks 24 rigidly affixed to the frame 12. The cam blocks 24 preferably are suspended from the frame by suitable hanger pins 26 rigidly coupled with the frame 12. The cam blocks 24 preferably are of a disk-shaped configuration and, where desired, may be set into the beam forming the frame 12.

In practice, the stub shafts 23 of the end portions 22 of the axle 18 are received in bifurcated slots 28 formed in the cam blocks 24. Each slot is defined by a bifurcated upper cam surface 30, having adjacent segments intersecting at a recess 32, and a lower bifurcated surface 34, opposite the cam surface 30, having adjacent segments which intersect at a rise 36 vertically spaced from the recess 32. The surface 30 rests upon the stub shaft 23, while the surface 34, in effect, serves as a retainer for the end portion 22 of the axle 18.

It is to be understood that each of the end portions 22 of the axle 18 is afforded lateral displacement between the opposite ends of a slot 28, as a stub shaft 23 is slid along a bifurcated surface 30. However, any lateral motion of an end portion 22 is arrested as the associated stub shaft 23 seats in a recess 32. Hence, it should be apparent that each of the end portions 22 of the axle 18 has a throw extending between the opposite ends of the slot 28, while the lateral motion thereof may be arrested midway therebetween, as the associated stub shaft 23 passes the recess 32. In view of the weight of the vehicle, it also can be appreciated that when a stub shaft 23 is seated in a recess 32, or at either end of a slot 28, the position of the associated end portion 22 remains fixed relative to the frame 12. Thus the steering assembly 21 is caused to function as a tristable steering assembly.

Figure 3:
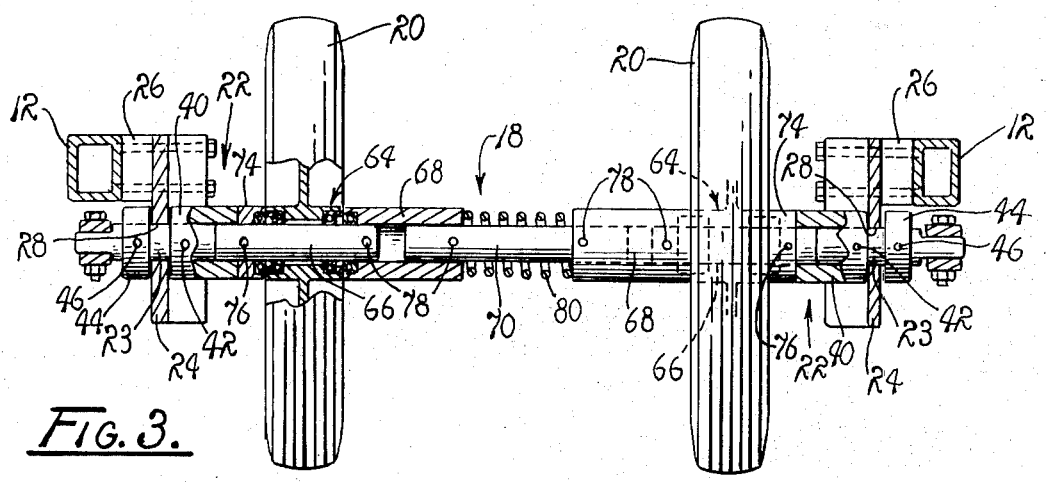
FIG. 3 is a cross-sectional end view taken generally along line 3—3 of FIG. 1.

As best shown in FIG. 3, each stub shaft 23 is coaxially extended from a nipple 40 and pinned thereto by a suitable pin 42. As a practical matter, the end surfaces of the nipples 40, immediately adjacent the innermost disk-shaped surfaces of the cam blocks 24, serve as plane bearing surfaces for guiding the end portions 22 along arcuate paths as they are angularly displaced along the surfaces of the slots 28. A collar 44 preferably is provided and pinned to each of the stub shafts 23, employing suitable pins 46 at the sides of the cam blocks 24 opposite the nipples 40. Accordingly, the opposite lateral surfaces of the cam blocks 24 serve as plane bearing surfaces for guiding the end portions 22 of the axle 18 as the axle is pivotally displaced about its midpoint for imparting steerage to the vehicle 10.

Pivotal displacement is imparted to the axle 18 through an actuation of a pair of hydraulic rams 48 and 50 fixed to the frame 12 and coupled in an hydraulic circuit, generally designated 52. Each of the rams preferably is a double-acting hydraulic cylinder connected with an hydraulic pump 54 through a manually operable selector valve 56, FIG. 1. The rams 48 and 50 include reciprocating output shafts 58 and 60, respectively, while the actuator rams 48 and 50 are connected with the valve 56 through suitable tubing 62. The rams are so related within the circuit 52 that, when actuated, simultaneous rectilinear reciprocation is imparted to the shafts 58 and 60 in relatively reversed directions.

The distal ends of the shafts 58 and 60, in turn, are coupled to the opposite end portions 22 through a pair of clevises 62 so that the end portions 22 of the axle 18 are displaced in opposite directions in response to an activation of the pump 54. Hence, it should be apparent that the stub shafts 23 are simultaneously advanced from the recess 32 of the pair of cam blocks 24, in fore-and-aft directions along the surfaces 30 of the slots 28 of the cam blocks for varying the angular relationship of the wheels 20 relative to the frame 12.

It is to be understood that the wheels 20 are mounted on the axle 18 employing suitable bearing structure, generally designated 64. Of course, operational conditions often require that the wheels 20 be removed from the axle, for repair and similar purposes.

In order to facilitate removal of the wheels 20, the axle 18 preferably is provided as a segmented axle, the opposite end portions thereof being of a similar construction. As illustrated in FIG. 3, the axle 18 includes a stub shaft 66 coaxially related to the stub shaft 23 and received in telescoping relation by the nipple 40. The shaft 66 supports thereon the bearing structure 64, in a concentric relationship, while the opposite end of the shaft 66 is, in turn, received in telescoping relation by a tubular sleeve 68. This sleeve preferably is extended from one end of a center shaft 70.

Disposed between the nipple 40 and the wheel 20 there is a collar 74 which is pinned to the shaft 66 by a suitable pin 76. This collar functions as a spacer block. Similarly, the sleeve 68 is pinned to the shaft 70, as well as to the shaft 66, by suitable pins 78 which readily can be removed. Of course, in the event the pins 78 are removed, the sleeves 68 are free to slide along the shaft 70 through a distance sufficient to accommodate an extraction of the ends of the shafts 66 from the nipples 40, for thus accommodating a removal of the wheels 20 from the frame. Where desired, a compression spring 80 is provided in interposed relation with the adjacent ends of the sleeves 68 so that extraction of the shaft 66 from the nipples 40 can be achieved only against the force axially applied thereby. While not shown, it also is to be understood that a resilient member, acting as a shock absorber, can be interposed between the axle 23 and the cam block 24, preferably within the recess 32, where so desired.

Additionally, where it is found desirable to employ the cam blocks 24 in imposing steerage, under conditions which render a use of a segmented axle, such as the axle 18, undesirable, each of the cam blocks 24 is provided with a vertical relief, not shown, extending upwardly from the bottom of each of the cam blocks to intersect with the slot 28. In such instances, the vertically extended relief is provided with a filler block, also not shown, which can be bolted or tackwelded in place.

Such blocks impede removal of the end portions 22 of the axle 18 therethrough. Of course, once a filler block is removed, extraction of one end of the axle 18 from the cam block is facilitated.

OPERATION

It is believed that in view of the foregoing description, the operation of the device will be readily understood and it will be briefly reviewed at this point.

With the vehicle 10 assembled in the manner hereinbefore described, it is prepared for rolling motion between selected destinations and is steered in response to a manipulation of the valve 56.

It is here to be noted, particularly, that the frame 12 preferably is provided as a supporting frame for a motorized vehicle, such as an automobile. However, the frame 12 can be employed equally as well in supporting rolling stock of infinite varieties including trailers and recreational vehicles.

Steerage of the vehicle 10 results from an introduction of hydraulic fluid into the relatively opposite ends of the rams 48 and 50, so that the shafts 58 and 60 thereof are caused to move in relatively opposite directions for imparting opposed lateral displacement to the opposite end portions 22 of the segmented axle 18.

As the hydraulic fluid pressure is introduced, under pressure, the stub shafts 23 are moved out of the recesses 32, in opposite directions, and along the cam surfaces 30 for thereby causing the axle 18 to pivot about its midpoint. Of course, a reversed pressurization of the rams 48 and 50 serves to reverse the direction in which the opposite end portions 22 of the axle 18 are advanced. Accordingly, it should readily be apparent that it is possible to vary the angular relationship of the wheels 20 with respect to the frame 12 through a simple manipulation of the valve 56 for thus imposing steerage on the vehicle.

Where it is desired that the wheels 20 be removed, the pins 78 are extracted and the wheels 20 advanced axially toward the longitudinally extended center line of symmetry of the vehicle 10 for thus causing the sleeves 68 to advance along the center shaft 70 against the applied forces of the spring 80. Thus the shafts 66 are extracted from the nipples 40. Of course, a remounting of the wheels 20 is achieved in a similar but reversed fashion.

While the invention, as hereinbefore described, employs a single axle mounted within a pair of laterally spaced cam blocks 24, it is to be understood that the vehicle 10 can be provided, as desired, with any selected number of segmented axles, all mounted in a similar fashion for enhancing steerage of the vehicle. Furthermore, while it is preferred that a single solid axle 14 be suspended beneath the frame 12, it is to be understood that a segmented axle 18 can be mounted in a similar fashion, without employing the bearing blocks 24.

In view of the foregoing, it should be apparent that the vehicle 10 of the instant invention provides a practical and economical solution to the heretofore perplexing problem of mounting wheels in a protected condition relative to frames of vehicles.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patents is:

1. A steerable vehicle comprising:
    A. an endless beam defining a closed frame of a substantially symmetrical configuration;
    B. a plurality of mutually spaced axles traversing said frame, at least one of said axles being characterized by a plurality of separable segments;
    C. coupling means for joining the opposite end portions of said plurality of axles with said frame including at least one pair of cam blocks affixed to said frame, each being provided with a pair of downwardly diverging, bifurcated cam surfaces for alternately engaging one end portion of one axle of said plurality of axles as oscillatory motion is imparted to the axle;
    D. actuating means connected with said one axle for imparting thereto oscillatory motion; and
    E. means for supporting said frame for lateral motion including a plurality of wheels mounted for rotation on said plurality of axles in an enclosed relationship with said frame.

2. The vehicle of claim 1 wherein each cam block of said pair of cam blocks includes an horizontally oriented arcuate cam surface and each end portion of said one axle includes a cam surface affixed to the axle and supported in sliding engagement with one horizontally oriented cam surface.

3. The vehicle of claim 1 wherein said actuating means comprises a pair of hydraulic rams having a pair of reciprocable output shafts connected with the end portions of said one axle, and a selectively operable hydraulic circuit coupled with each ram of said pair of rams for imparting reciprocation to said shafts.

4. The vehicle of claim 3 wherein said one axle is characterized by a plurality of integrated telescoping segments.

5. A steerable vehicle comprising:
    A. an endless beam defining a symmetrical frame of a substantially rectangular configuration;
    B. a pair of longitudinally spaced axles extended between the opposite sides of said frame;
    C. a plurality of wheels mounted on each of said axles;
    D. coupling means for joining the opposite end portions of one axle of said pair of axles with said frame, including a pair of cam blocks each being rigidly affixed to one side of said frame, adjacent to an end portion of said one axle, each of said cam blocks being provided with a bifurcated slot forming a downwardly diverging cam surface for receiving in supporting engagement an end portion of said one axle, and an arcuate cam surface facing the opposite side of said frame, and a vertically oriented plane bearing surface affixed to each end portion of said axle supported in an abutting engagement with an arcuate cam surface;
    E. a pair of hydraulic rams affixed to said frame, including a pair of reciprocable output shafts pivotally coupled with the opposite end portions of said one axle; and
    F. an hydraulic circuit including a selector valve coupled with said rams for imparting simultaneous linear motion to said output shafts, in relatively reversed directions, whereby said axle is pivotally displaced in lateral directions about a vertical axis passing through the midpoint of the axle.

6. A steering assembly for use in steering a vehicle supported for rolling motion comprising:
- A. an axle;
- B. a pair of laterally spaced wheels mounted at the opposite end portions of said axle;
- C. coupling means for joining the opposite end portions of said axle with a given vehicle including a pair of cam blocks, each cam block of said pair being rigidly affixed to one side of the frame and having a bifurcated slot forming a downwardly diverging cam surface for receiving in supporting engagement an end portion of said axle, and a horizontally oriented, arcuate cam surface facing the opposite side of said frame;
- D. means including a vertically oriented plane bearing surface affixed to each end portion of said axle supported in abutting engagement with an arcuate cam surface;
- E. a pair of hydraulic rams, each having output shafts coupled with one end portion of said axle; and
- F. an hydraulic circuit including a selector valve coupled with said rams for imparting to said output shafts simultaneous linear motion in relatively reversed directions, whereby said axle is pivotally displaced in lateral directions about the midpoint of the axle.

7. The assembly of claim 6 wherein said downwardly diverging cam surfaces intersect at a recess configured to receive therein an end portion of said axle.

* * * * *